United States Patent
Seemann et al.

(10) Patent No.: US 11,909,851 B2
(45) Date of Patent: Feb. 20, 2024

(54) COALESCING INTERRUPTS BASED ON FRAGMENT INFORMATION IN PACKETS AND A NETWORK CONTROLLER FOR COALESCING

(71) Applicant: NXP B.V., Eindhoven (NL)

(72) Inventors: Jochen Seemann, Eindhoven (NL); Andrei Sergeevich Terechko, Eindhoven (NL)

(73) Assignee: NXP B.V., Eindhoven (NL)

( * ) Notice: Subject to any disclaimer, the term of this patent is extended or adjusted under 35 U.S.C. 154(b) by 242 days.

(21) Appl. No.: 17/449,859

(22) Filed: Oct. 4, 2021

(65) Prior Publication Data
US 2023/0103738 A1  Apr. 6, 2023

(51) Int. Cl.
  *H04L 69/22* (2022.01)
  *H04L 69/32* (2022.01)
  *H04L 69/166* (2022.01)
  *H04L 49/9057* (2022.01)
  *G06F 9/48* (2006.01)
  *G06F 13/24* (2006.01)
  *H04L 45/74* (2022.01)

(52) U.S. Cl.
  CPC ............ *H04L 69/22* (2013.01); *G06F 9/4812* (2013.01); *H04L 45/74* (2013.01)

(58) Field of Classification Search
  None
  See application file for complete search history.

(56) References Cited

U.S. PATENT DOCUMENTS

| | | | | |
|---|---|---|---|---|
| 5,396,490 A | * | 3/1995 | White | H04L 9/40 370/474 |
| 7,444,451 B2 | | 10/2008 | Wang et al. | |
| 7,987,307 B2 | | 7/2011 | Wang et al. | |
| 2006/0075172 A1 | * | 4/2006 | Anand | H04L 69/22 710/260 |
| 2006/0104303 A1 | * | 5/2006 | Makineni | H04L 69/161 370/463 |
| 2007/0014246 A1 | * | 1/2007 | Aloni | H04L 47/10 370/254 |
| 2007/0143513 A1 | | 6/2007 | Sarangam et al. | |
| 2008/0091868 A1 | * | 4/2008 | Mizrachi | G06F 13/24 710/263 |
| 2019/0163538 A1 | | 5/2019 | Klein et al. | |

(Continued)

OTHER PUBLICATIONS

Goglin et al., "Finding a Tradeoff between Host Interrupt Load and MPI Latency over Ethernet," https://hal.inria.fr/inria-00397328, Jun. 20, 2009, 10 pages.

*Primary Examiner* — Duc T Duong

(57) ABSTRACT

A packet is transmitted from a remote device over a communication network. A fragment detector detects one or more fragments in a field of the packet, where the field is associated with a session layer or higher abstraction layer of an open systems interconnect (OSI) model. Fragment information is extracted from the packet which indicates one or more of a last fragment index associated with a last fragment of one or more fragment in the packet and a fragment count indicative of a number of fragments associated with a message which is fragmented. Interrupts associated with the packet with other interrupts associated with other packets are coalesced based on one or more of the last fragment index and the fragment count.

20 Claims, 6 Drawing Sheets

(56) References Cited

U.S. PATENT DOCUMENTS

2020/0204503 A1* 6/2020 Cornett .............. G06F 12/0802
2021/0096770 A1 4/2021 Yamaguchi
2022/0335563 A1* 10/2022 Elzur ....................... G06T 1/60

* cited by examiner

US 11,909,851 B2

COALESCING INTERRUPTS BASED ON FRAGMENT INFORMATION IN PACKETS AND A NETWORK CONTROLLER FOR COALESCING

FIELD OF USE

This disclosure generally relates to a network controller which receives packets having fragments, and more particularly to coalescing interrupts associated with the packets based on fragment information in the packets.

BACKGROUND

A modern car network infrastructure is occupied by autonomous driving sensors like radar, light detection and ranging (LIDAR), cameras, etc. The sensors generate sensor data which is formatted into packets and transmitted to a network controller in the network infrastructure using a protocol such as Ethernet protocol. The network controller receives the packets and interrupts a host processor in communication with the network controller each time a packet is received to process the sensor data in the packets.

Figure 1:
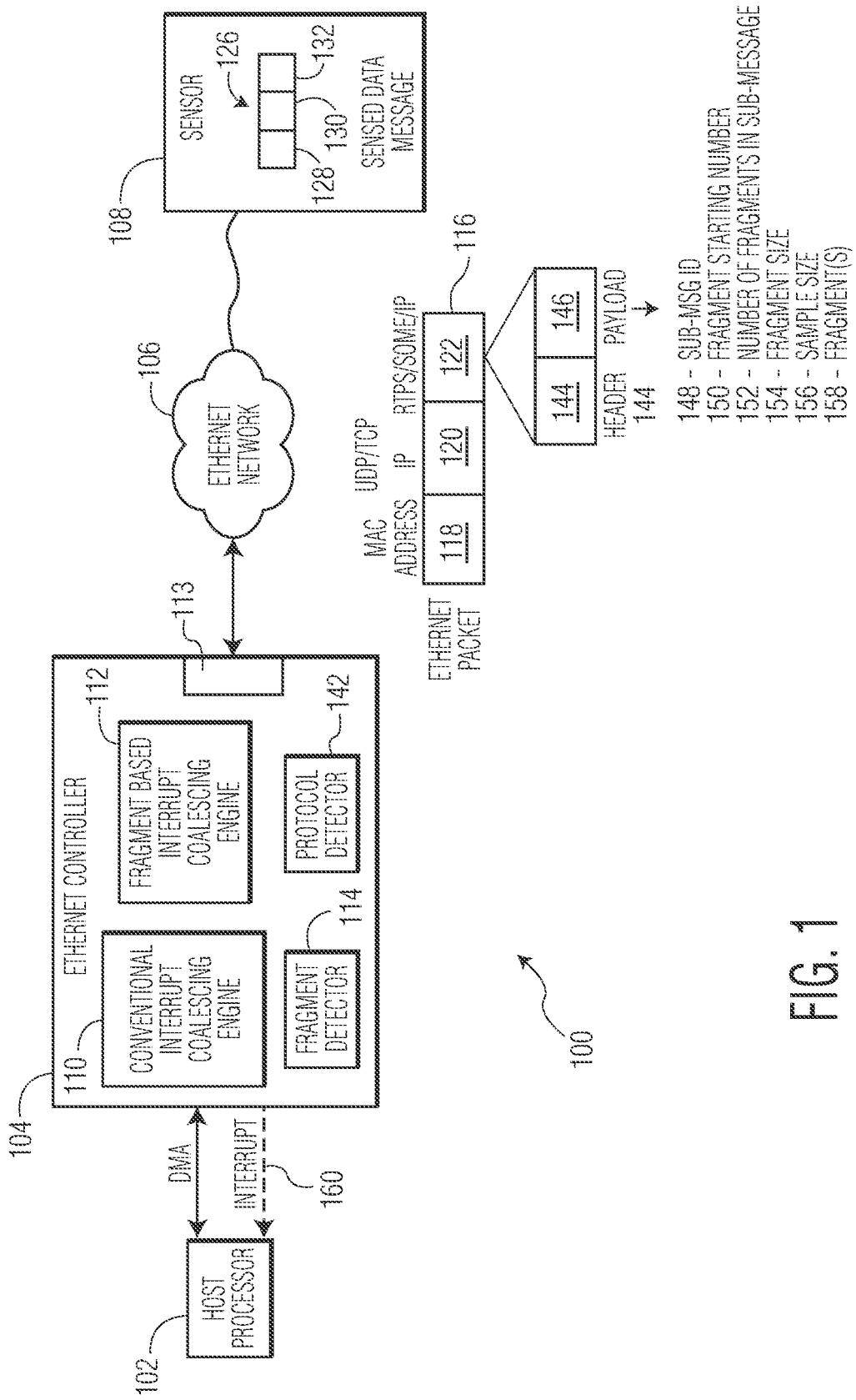
FIG. 1 is an example block diagram of a communication system for coalescing interrupts of packets in accordance with one or more embodiments.

The drawings are for the purpose of illustrating example embodiments, but it is understood that the embodiments are not limited to the arrangements and instrumentality shown in the drawings.

DETAILED DESCRIPTION

Excessively interrupting the host processor to process received packets such as Ethernet packets results in high processor usage. To reduce a number of interrupts to the host processor, the interrupts associated with Ethernet packets are coalesced. Instead of generating an interrupt to the host processor for each Ethernet packet that is received, a network controller coupled to the host processor coalesces the interrupts associated with a plurality of Ethernet packets into a single interrupt sent to the host processor. Then, the host processor receives the Ethernet packets associated with the coalesced interrupt in response to the single interrupt. Such conventional coalescing reduces processor usage but does not preserve latency of high priority Ethernet packets and cannot be used for safety-critical applications with low latency requirements because interrupts associated with unrelated Ethernet packets some of which might be for safety-critical applications are coalesced. This coalescing resulting in delays before the host processor is interrupted to indicate receipt of the Ethernet packets associated with the safety-critical applications and the packets are processed. Further, the coalescing is performed based on fixed parameters such as coalescing a fixed number of packets or coalescing a variable number of packets received in a fixed time without consideration of a type of payload of the packets which are coalesced also adding to delays.

Ethernet packets define a maximum transmission unit (MTU) or packet length of typically 1500 bytes which is typically smaller than messages generated by the sensors that define sensor data. To transmit the messages bigger than the MTU using the Ethernet protocol, a transmitter of the sensor fragments the message and transmits the fragments in respective Ethernet packets to the receiver. Ethernet-based protocols like Real-Time Publish Subscribe (RTPS) or Scalable Service Oriented Middleware over IP (SOME/IP) include information in the Ethernet packet which identifies the Ethernet-based protocol and whether the Ethernet packet has a fragment.

Embodiments disclosed herein are directed to coalescing interrupts associated with packets such as Ethernet packets having fragments while preserving latency for high priority packets and last fragment packets. A message such as from an automated driving sensor is fragmented into a plurality of fragments and a transmitter transmits the fragments in respective Ethernet packets to a receiver. The information in the Ethernet packet which indicates whether the Ethernet packet has a fragment and which Ethernet based protocol is associated with the Ethernet packet is used to determine whether to coalesce interrupts associated with each Ethernet packet. If the Ethernet packet has a fragment and is associated with a certain Ethernet-based protocol, then a last fragment index in the packet (FI) or a total number of fragments in the message (FC) that is fragmented is used to determine whether to coalesce interrupts. If interrupts are to be coalesced, then the interrupts associated specifically with a plurality of Ethernet packet with fragments received and associated with the certain Ethernet-based protocol since a last interrupt was sent to the host processor are coalesced. If interrupts are not coalesced, then the plurality of Ethernet packet with fragments received and associated with the certain Ethernet-based protocol since the last interrupt was sent to the host processor are further sent to the host processor. For a light detection and ranging (LIDAR) sensor which generates 240 Mbit/s, the interrupts to the host processor are reduced by 90% while having roughly the same processor impact as a 24 Mbit/s bandwidth stream while preserving receiver latency when interrupts associated with 10 fragments are coalesced at a time as an example.

FIG. 1 is an example block diagram of a communication system 100 for coalescing interrupts of packets in accordance with one or more embodiments. The communication system 100 comprises a host processor 102, a network controller such as an Ethernet controller 104, and a sensor 108 each implemented using circuitry such as analog circuitry, mix signal circuitry, memory circuitry, logic circuitry, and/or processing circuitry arranged to execute code stored in a memory and when executed by the processing circuitry perform the disclosed functions, or combinations thereof.

In the communication system 100, the sensor 108 may function as a transmitter which transmits a packet such as an Ethernet packet 116 from the sensor 108 over an Ethernet network 106 to the Ethernet controller 104 and host processor 102 which collectively functions as a receiver to receive the Ethernet packet 116. An example Ethernet packet 116 may have a plurality of fields 118-122. The fields 118-122 may be associated with layers of an open systems interconnect (OSI) model or equivalent layers of a Transmission Control Protocol/Internet Protocol (TCP/IP) model which conceptualizes functions of a networking system. In an example, the OSI model includes seven layers including a physical layer, data link layer, network layer, transport layer, session layer, presentation layer, and application layer. In an example, the field 118 and field 120 may carry data associated with one or more of a data link layer, a network layer, and transport layer of the OSI model and the field 122 may carry data associated with a session layer of the OSI model. In an example, the data of the field 118 may define a media access control (MAC) address of the Ethernet protocol associated with communications between two directly connected nodes in the Ethernet network in the data link layer. In an example, the data of the field 120 may define an internet protocol (IP) address associated with communications between nodes in different networks in a network layer and facilitate reliable transport of packets from a source to a destination according to one or more of a transmission control protocol (TCP) and a user data protocol (UDP) in a transport layer. In an example, the data of the field 122 may control connections between applications in a session layer and define a Real-Time Publish Subscribe (RTPS) protocol or a Scalable Service Oriented Middleware over IP (SOME/IP).

In a modern car network infrastructure supporting autonomous driving, the sensor 108 may be a radar system, light detection and ranging (LIDAR) system, a camera system etc. The sensor 108 may generate a message 126 with the sensed data which is transmitted as the Ethernet packet 116 to the receiver with the Ethernet controller 104 and host processor 102 for processing. The Ethernet packet 116 may define a maximum transmission unit (MTU) or packet length of typically 1500 bytes which is typically smaller than the message 126 generated by the sensor 108. To transmit the message 126 bigger than the MTU using the Ethernet protocol, the transmitter of the sensor 108 fragments the message 126 into fragments which in this example is three fragments 128-132 but which could be more or less fragments, and transmits the fragments in a respective Ethernet packet to the Ethernet controller 104. The field 122 of the Ethernet packet 116 may be further defined with a header 144 and a payload 146. In an example, the header 144 may identify a session protocol of the Ethernet packet 116 which is Ethernet-based such as RTPS protocol or SOME/IP by a "magic" which is a fixed sequence of bytes to indicate the protocol. In an example, the payload 146 may have a submessage defined by Ethernet-based protocols like Real-Time Publish Subscribe (RTPS) or Scalable Service Oriented Middleware over IP (SOME/IP) with a fragment. The field 122 may have one or more submessages in the payload 146 to transmit one or more fragments of messages or data which is not a fragment (e.g., complete messages).

Further, the payload 146 may include information which indicates whether the Ethernet packet 116 has a fragment, characteristics of the fragment, and the fragment itself. In an example, a submessage identifier 148 (submessage ID) in a submessage header may indicate whether the payload 146 comprises a fragment. The submessage ID 150 having a value of 0x16 may indicate that the payload 146 has one or more fragments while a value of 0x15 may indicate the payload 146 has data which is not a fragment. The submessage header may have the following additional fields. In an example, a fragment starting number or index 150 may identify a number or index of the first fragment in the payload 146 and uniquely identify the fragments. In an example, a number of fragments in submessage 152 may indicate a number of fragments in the submessage. In an example, a fragment size 154 may indicate a size of each fragment. In an example, a sample size 156 may indicate a size of the message (i.e., sample size) generated by the sensor 108 which was fragmented. The payload 146 may then have one or more fragments 158.

Conventionally, the Ethernet controller 104 receives an Ethernet packet at a receiver interface 113 and interrupts the host processor 102 each time the Ethernet controller 104 receives an Ethernet packet. Excessively interrupting the host processor 102 to process received Ethernet packets results in high processor usage.

Embodiments disclosed herein are directed to coalescing interrupts associated with packets such as Ethernet packets having fragments while preserving receiver latency. A message such as from the sensors 108 is fragmented into a plurality of fragments and transmitted in respective Ethernet packets to the Ethernet controller 104. The Ethernet controller 104 has a fragment detector 114, a session layer protocol detector 142, a conventional interrupt coalescing engine 110, and a fragment based interrupt coalescing engine 112. The session layer protocol detector 142 and fragment detector 114 may use the information in the field 122 of the Ethernet packet 116 to respectively determine a type of session layer protocol of the Ethernet packet 116 and whether the Ethernet packet 116 has a fragment to determine whether to coalesce the interrupt associated with the Ethernet packet 116 with other Ethernet packets. If the Ethernet packet 116 does not indicate a fragment, then the conventional interrupt coalescing engine 110 coalesces the interrupts associated with a plurality of Ethernet packet received since a last interrupt was sent to the host processor 102. In an example, the plurality of Ethernet packets whose interrupts are coalesced conventionally is a specific count of packets (frame count based) or a number of packets received in a period of time (timer based). If the Ethernet packet 116 has a fragment and is associated with a certain Ethernet-based protocol, then the fragment-based interrupt coalescing engine 112 determines a last fragment index in the packet (FI) or the total number of fragments in the message (FC) based on the information in the field 122 such as the number of fragments in submessage 152, the fragment size 154, and the sample size 156. In an example, the FI and FC may be determined according to the following relationships:

$$\text{last fragment index in packet(FI)} = \text{fragmentStartingIndex} + (\text{fragmentsInSubmessage} - 1) \qquad (\text{EQ 1})$$

$$\text{total fragments in message(FC)} = \text{sampleSize}/\text{fragmentSize} \qquad (\text{EQ2})$$

To illustrate calculation of the FI, consider a message with a "total fragments in message"=103. If each Ethernet packet is arranged to carry 10 fragments, the sensor 108 may transmit and the receiver may receive 11 packets, with following information in a respective packet:

TABLE 1

|  | Pkt 1 | Pkt 2 | Pkt 3 | Pkt 4 | Pkt 5 | Pkt 6 | Pkt 7 | Pkt 8 | Pkt 9 | Pkt1 10 | Pkt1 11 |
|---|---|---|---|---|---|---|---|---|---|---|---|
| fragmentStartingIndex: | 1 | 11 | 21 | 31 | 41 | 51 | 61 | 71 | 81 | 91 | 101 |
| fragmentsInSubmessage | 10 | 10 | 10 | 10 | 10 | 10 | 10 | 10 | 10 | 10 | 3 |

The FI may be then calculated based on EQ 1 as:

TABLE 2

|  | Pkt1 | Pkt2 | Pkt3 | Pkt4 | Pkt5 | Pkt6 | Pkt7 | Pkt8 | Pkt9 | Pkt10 | Pkt11 |
|---|---|---|---|---|---|---|---|---|---|---|---|
| last fragment index (FI): | 10 | 20 | 30 | 40 | 50 | 60 | 70 | 80 | 90 | 100 | 103 |

The fragment-based interrupt coalescing engine 112 uses the FI and FC to determine whether the interrupts associated with a plurality of Ethernet packet with fragments and the certain Ethernet-based protocol is coalesced. The plurality of Ethernet packets are those packets received and associated with certain Ethernet-based protocol since a last interrupt was sent to the host processor 102. If interrupts are to be coalesced, then the interrupts associated with a plurality of Ethernet packet with fragments received and associated with the certain Ethernet-based protocol since a last interrupt was sent to the host processor 102 are coalesced. If the interrupt is not coalesced, then the Ethernet controller 104 may raise an interrupt 160 to the host processor 102. In an example, the host processor 102 may then run an Interrupt Service Routine (ISR), which will inform an Ethernet operating system (OS) driver running on the host processor 102 about pending packets to be received. The driver may then transfer the packets from an Ethernet controller hardware buffer to system memory (DRAM) of the host processor 102. In an example, the driver may initiate a direct memory access (DMA) data transfer to transfer the packets. After that, the driver and TCP/IP stack of the OS may continue processing the packets by forwarding the packets to a socket library and application running on the host processor 102 via the system memory. For the sensor 108 which is a light detection and ranging (LIDAR) sensor which generates 240 Mbit/s, the interrupts are reduced by 90% while having roughly the same processor impact as a 24 Mbit/s bandwidth stream while preserving receiver latency when interrupts associated with 10 fragments are coalesced at a time as an example.

Figure 2:
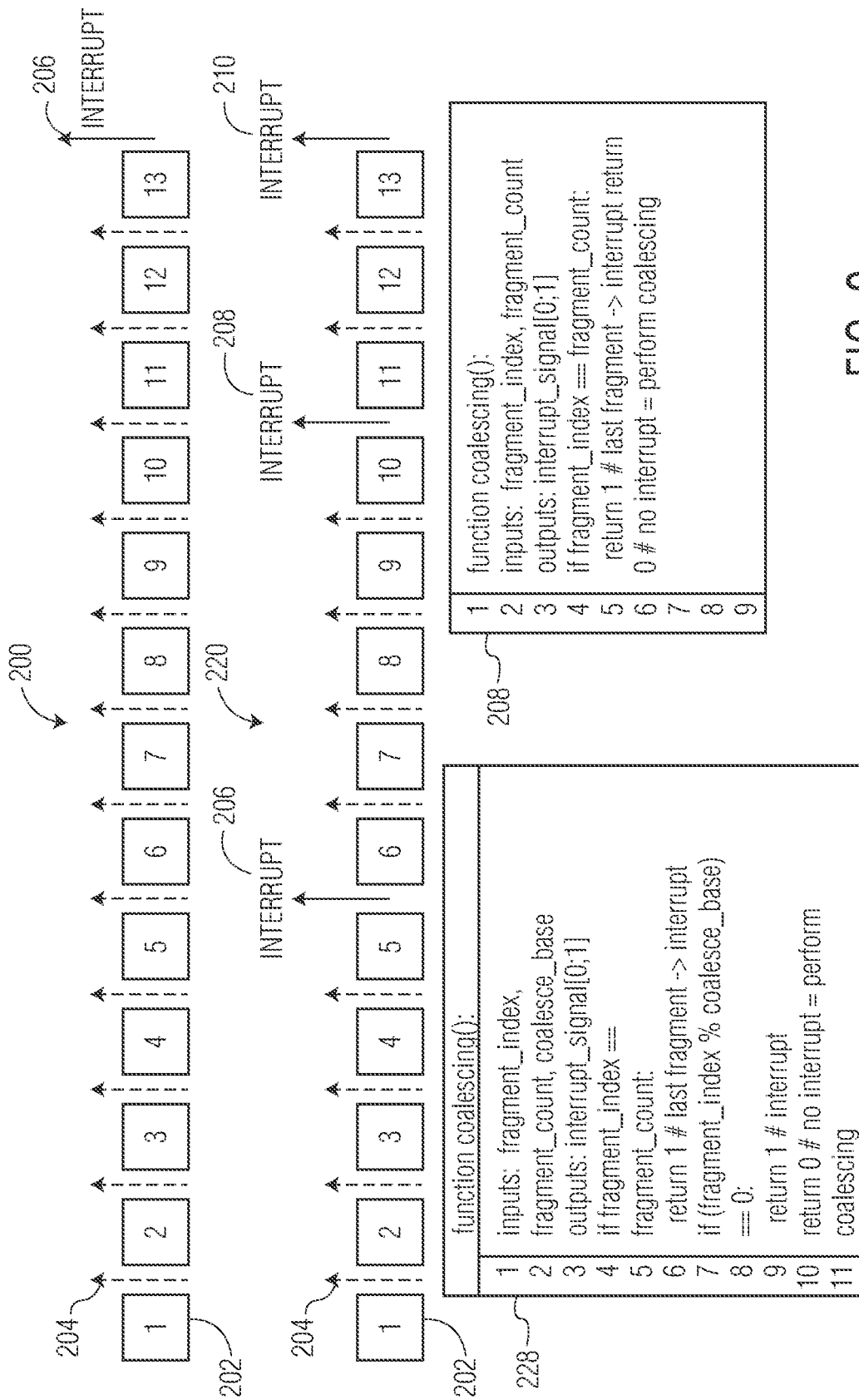
FIG. 2 illustrates example streams of packets and coalescing interrupts associated with the example streams in accordance with one or more embodiments.

FIG. 2 illustrates examples of coalescing interrupts associated with streams 200, 220 of packets 202 in accordance with one or more embodiments. The Ethernet controller 104 may perform this coalescing.

In one example, the sensor 108 may generate a message which is then fragmented and transmitted to the Ethernet controller 104 as the stream 200 of the Ethernet packets 202. Information in field 122 of an Ethernet packet 202 may be used to determine the FI of each packet which ranges from 1 to 13, and the FC of the message. In this example, the FC may be 13 corresponding to the 13 packets each which has one fragment. The fragment-based interrupt coalescing engine 112 may coalesce interrupts 204 otherwise associated with each Ethernet packet 202. The dotted line of interrupts 204 may indicate that these interrupts are not sent to the host processor 102 and instead coalesced. The fragment-based interrupt coalescing engine 112 may generate an interrupt 206 indicated by a solid line when the FI equals the FC such that a last fragment of the message is received and send Ethernet packets 1-13 to the host processor 102 instead of sending interrupts 204 associated with each packet 202. Code 208 with a coalescing function 0 for the fragment-based interrupt coalescing block is also illustrated to process stream 200 and output the described interrupts.

In another example, the sensor 108 may generate a message which is then fragmented and transmitted to the Ethernet controller 104 as the stream 220 of the Ethernet packets 202. Information in field 122 of an Ethernet packet 202 may be used to determine the FI of each packet which ranges from 1 to 13, and the FC of the message. In this example, the FC may also be 13 corresponding to the 13 packets each which has one fragment. The fragment-based interrupt coalescing engine 112 may coalesce interrupts 204 otherwise associated with each Ethernet packet 202. The fragment-based interrupt coalescing engine 112 may coalesce interrupts 204 based on the FI or FC. In some examples, an operation involves performing a modulus operation of a coalesce base which indicates whether to coalesce interrupts or not coalesce interrupts. The dotted line of interrupts 204 may indicate that these interrupts are not sent to the host processor 102 and instead coalesced. The fragment-based interrupt coalescing engine 112 may generate an interrupt every time a modulus of the FI with respect to the coalesce base equals zero and otherwise coalesce interrupts 204. The solid line of interrupts may indicate that these interrupts are sent to the host processor 102. In the event that the coalesce base is five, the interrupts are coalesced except for every fifth packet. For example, the fragment-based interrupt coalescing engine 112 generates an interrupt 222 for the Ethernet packets with FI 1-5 rather than an interrupt 204 for each Ethernet packet 202. The interrupt may indicate to the host processor 102 that the Ethernet controller 104 may send packets 1-5 to the host processor 102. As another example, the fragment-based interrupt coalescing engine 112 generates an interrupt 224 for the Ethernet packets 6-10 rather than an interrupt 204 for each Ethernet packet 202. The interrupt may indicate that the Ethernet controller 104 may send packets 6-10 to the host processor 102. Further, fragment-based interrupt coalescing engine 112 may generate an interrupt 226 when the FI equals the FC such that a last fragment of the message is received and send Ethernet packets 11-13 to the host processor 102 instead of sending interrupts 204 associated with each packet 202. Code 228 with a coalescing function ( ) for the fragment-based interrupt coalescing block is also illustrated to process stream 220 and output the described interrupts.

Figure 3:
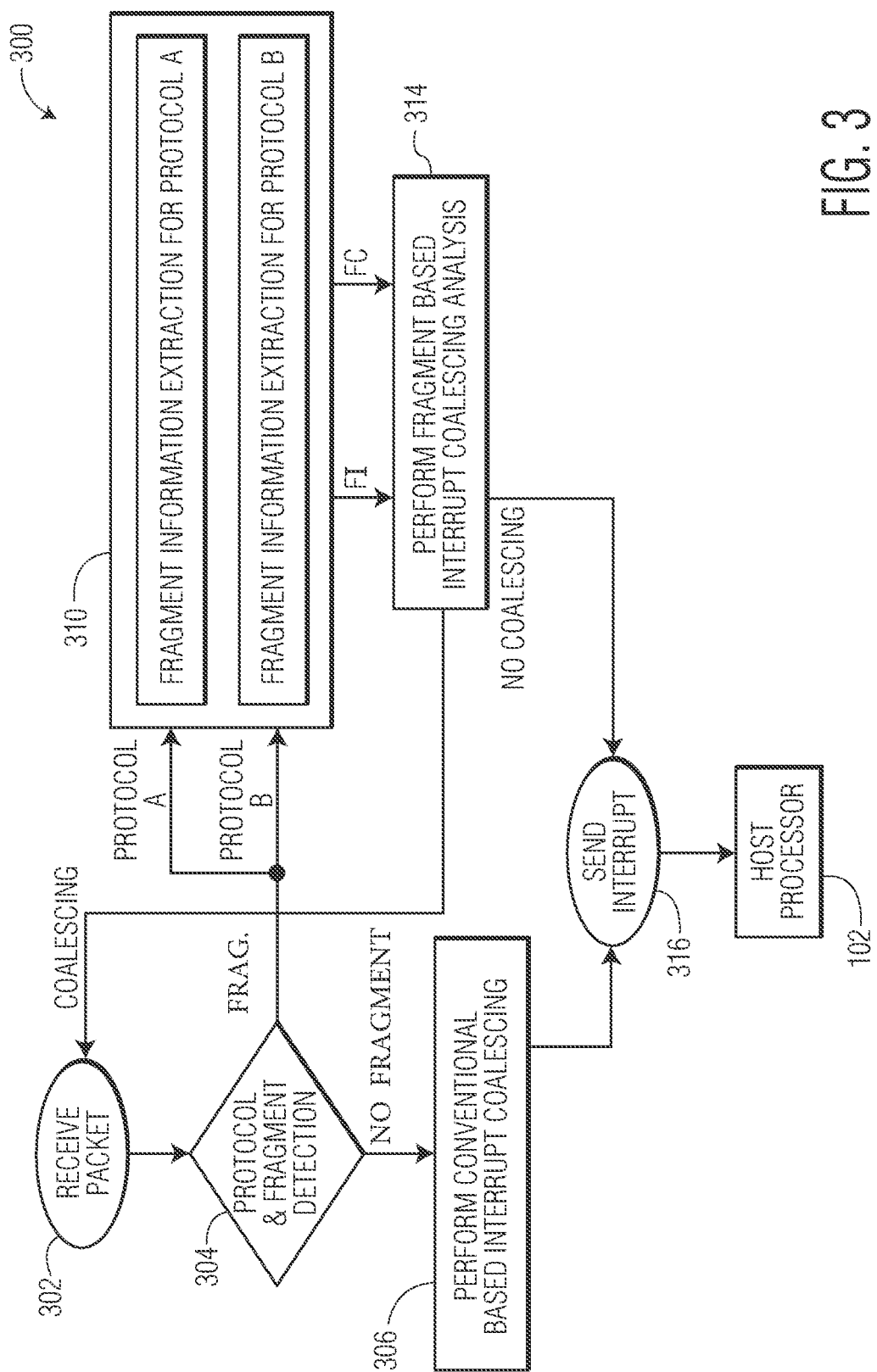
FIG. 3 is a flow chart of functions associated with coalescing interrupts associated with a plurality of packets in accordance with one or more embodiments.

FIG. 3 is a flow chart of functions 300 associated with coalescing interrupts associated with a plurality of packets in accordance with one or more embodiments. In an example, the functions 300 may be performed by the Ethernet controller 104 and specifically one or more of the fragment detector 114, protocol detector 142, conventional interrupt coalescing engine 110, and fragment based interrupt coalescing engine 112.

At 302, the Ethernet controller 102 receives a packet. For example, the sensor 108 may send the packet over the Ethernet network 106 to receiver interface 113 of the Ethernet controller 102. At 304, a protocol associated with the packet and whether the packet contains one or more fragments of a message generated by the sensor 108 are detected. In an example, the protocol detector 142 may detect the protocol as a session layer protocol (L5) such as SOME/IP or RPTS or higher layer protocol of the OSI model and based on the protocol, the fragment detector 114 may detect fragments in the packet. For example, if the protocol detected is the RPTS protocol, the submessages in the payload 146 of the field 122 of the packet may have a submessage identification 0x16 DATA_FRAG which indicates that the submessages of the packet has one or more fragments or a submessage identification 0x15 DATA which indicates that the submessages of the packet does not have one or more fragments based on the submessage identification. If no fragment is detected in the packet, then at 306, a conventional coalescing of interrupts associated with packets may be performed. The conventional interrupt coalescing engine 110 may perform this coalescing. That scheme will send an interrupt to the host processor 102 at 316 along with sending the packets without any fragments not yet sent after the last interrupt to the host processor 102 in a time period or after a number of packets are received. If a fragment is detected, then at 310 the fragment based interrupt coalescing engine 112 may determine information from the field 122 of the packet based on a given session protocol of the packet. The information may include fragment information to determine the last fragment index in the packet (FI) and the fragment count (FC). At 314, the fragment based interrupt coalescing engine 112 performs a fragmentation based interrupt coalescing analysis for packets of the given session protocol. For example, the FI and FC of the packet are used to determine whether an interrupt needs to be generated or the interrupt otherwise associated with the packet is coalesced with interrupts of other packets which have not been sent to the host processor 102 and associated with a same session protocol. If the interrupt is not to be coalesced, then at 316, the Ethernet controller 104 may generate an interrupt to the host processor 102 and the packets with fragments and same session protocol received after the last interrupt sent to the host processor 102 are also sent. Otherwise, the interrupt is coalesced and processing returns to 302.

Figure 4:
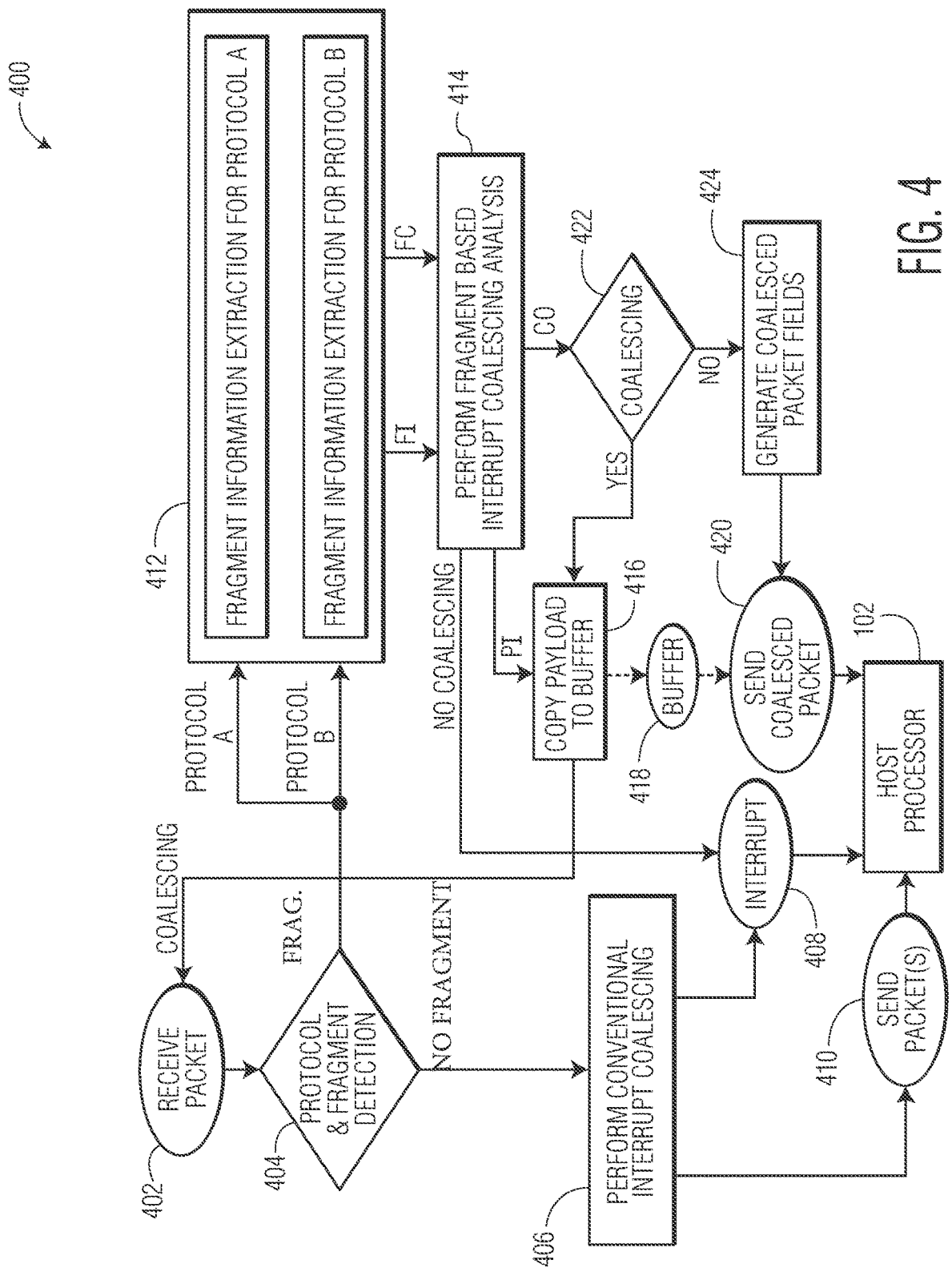
FIG. 4 is a flow chart of functions associated with coalescing interrupts and packets in accordance with one or more embodiments.

FIG. 4 is a flow chart of functions 400 associated with coalescing interrupts and packets associated with a plurality of packets in accordance with one or more embodiments. In an example, the functions 400 may be performed by the Ethernet controller 104 and specifically one or more of the fragment detector 114, protocol detector 142, conventional interrupt coalescing engine 110, and conventional interrupt coalescing engine 112.

At 402, the Ethernet controller 102 receives a packet. For example, the sensor 108 may send the packet over the Ethernet network 106 to the Ethernet controller 102. At 404, a determination is made whether the packet contains one or more fragments of a message generated by the sensor 108. In an example, the protocol detector 142 may detect a protocol which is a session layer protocol (L5) or higher layer protocol of the OSI model and based on the protocol, the fragment detector 114 may detect fragments in the packet. If no fragment is detected, then at 406, a conventional coalescing of interrupts associated with packets may be performed. The conventional interrupt coalescing engine 110 may perform this coalescing. That scheme may generate an interrupt to the host processor 102 at 408 along with sending the packets without any fragments not yet sent after the last interrupt to the host processor 102 in a time period or after a number of packets are received at 410. If a fragment is detected, then at 412, the fragment based interrupt coalescing engine 112 may determine fragment information from the field 122 of the packet based on the detected protocol. The fragment information may be used to determine the last fragment index in the packet (FI) and the overall payload fragment count (FC). At 414, the fragment based interrupt coalescing engine 112 may perform a fragment based interrupt coalescing analysis based on the FI and FC to provide an indication of whether to perform fragment based interrupt coalescing. The indication may be a variable CO which takes a value indicative of whether to coalesce interrupts. At 422, a determination is made whether the variable CO indicates to perform a coalescing of interrupts or not. If the interrupt of the packet is to be coalesced based on the FI and FC, then at 416 the payload 146 of the packet with the one or more fragments are copied to a buffer of the Ethernet controller 104 with an offset based on a packet index (PI) and processing returns to 402. In an example, the PI may be a value that starts with 0 and gets incremented by 1 every time the "Coalesce?" block 422 results in "yes". If "Coalesce?" yields "no", then the PI is reset back to 0. If the packet payload sizes differ, then another variable may be also maintained to determine the offset between payloads 146 in the buffer 418. If the interrupt is not to be coalesced based on the FI and FC, then at 408 the Ethernet controller 104 may send an interrupt to the host processor 102. Further, at 424, the fragment based interrupt coalescing engine 110 may generate fields 118-122 of a coalesced packet defined by the one or more payloads 146 with the one or more fragments in the buffer 418. In an example, the fields 118-122 comprise one or more of a checksum of the fragments in the buffer, number of fragments in the buffer (i.e., fragments not sent to the host processor 102), and the fragment starting index in the buffer. At 420, the Ethernet controller 104 may send a coalesced packet with the defined fields 118-122 and one or more payloads 146 in the buffer which have not been received by the host processor 102 since a last interrupt was sent to the host processor 102. In an example, modifications to a network stack on the host processor 102 are not needed in this embodiment with a tradeoff of a copy operation to the buffer in forming the coalesced packet. Further differences to conventional coalescing include coalescing interrupts associated with packets carrying fragments at the session level of the OSI model.

Figure 5:
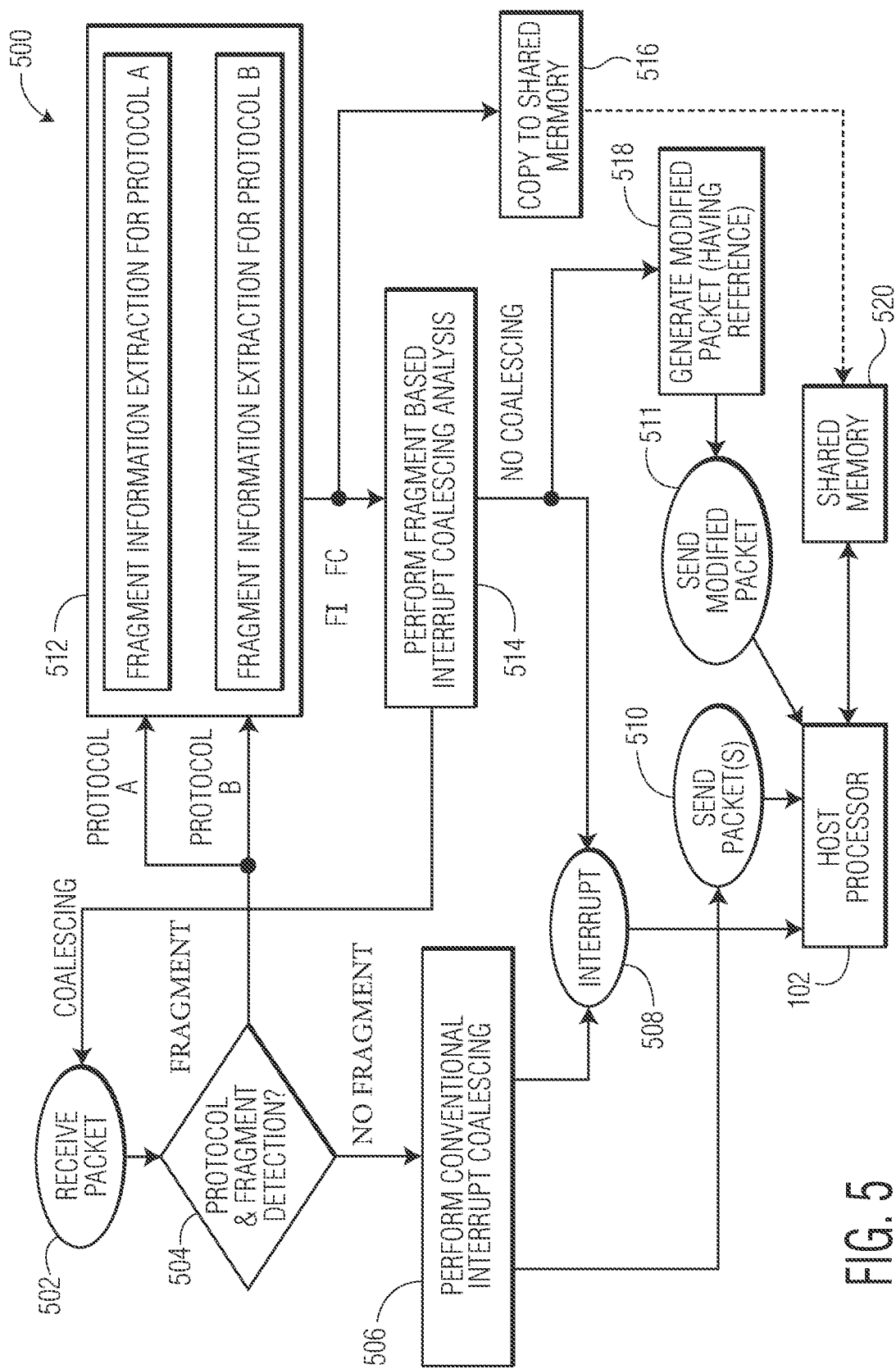
FIG. 5 is an alternative flow chart of functions associated with coalescing interrupts in accordance with one or more embodiments.

FIG. 5 is an alternative flow chart of functions 500 associated with coalescing interrupts in accordance with one or more embodiments. In an example, the functions 500 may be performed by the Ethernet controller 104 and specifically one or more of the fragment detector 114, protocol detector 142, conventional interrupt coalescing engine 110, and fragment based interrupt coalescing engine 112. In FIG. 4, the Ethernet controller 104 copies the fragments in the buffer into a packet which is sent to the host processor 102. The functions 500 avoid this copy operation by copying the fragments of the packet directly to a shared memory 520 accessible to both the Ethernet controller 104 and the host processor 102.

At 502, the Ethernet controller 102 receives a packet. For example, the sensor 108 may send the packet over the Ethernet network 106 and the Ethernet controller 102 may receive the packet. At 504, a determination is made whether the packet contains one or more fragments of a message generated by the sensor 108. In an example, the protocol detector 142 detects a protocol which is a session layer protocol (L5) or higher layer protocol and based on the protocol, the fragment detector 114 may detect fragments in the packet. If no fragment is detected, then at 506, the conventional interrupt coalescing engine 110 may perform a conventional coalescing of interrupts associated with packets. That scheme will generate an interrupt to the host processor 102 at 508 along with sending the packets without any fragments not yet sent after the last interrupt to the host processor 102 in a time period or after a number of packets are received at 510. If a fragment is detected, then at 512, the fragment information for a given session protocol is determined from the field 122 of the packet based on the detected protocol. For example, the fragment information may be the last fragment index in the packet (FI) and the overall payload fragment count (FC). The Ethernet controller 104 may then reserve a chunk of memory in the shared memory 520 and at 516 identify and copy the payload 146 of the one or more packets with the one or more fragments in the shared memory 520. The shared memory 520 may be memory shared between the host processor 102 and the Ethernet controller 104. At 514, a fragment based interrupt coalescing may be performed. In an example, the FI and FC of the packet are used to determine whether an interrupt needs to be generated. If the FI and FC indicate that the interrupt associated with the packet is to be coalesced, then an interrupt is not generated and processing returns to 502. If the FI and FC indicate that the interrupt associated with the packet is not to be coalesced, then the interrupt is generated and sent to the host processor 102 at 508. Further, at 518, one or more fields 118-122 of the packet are modified to form a modified packet. In an example, the ID/field in the payload 146 in the field 122 which identifies the packet has having a fragment (RTPS: sub-message with ID 0x16) may be replaced with a reserved ID not defined by RTPS (RTPS: e.g. sub-message with ID 0x56) which indicates that the fragments of one or more payloads 146 of packets which have not been received by the host processor 102 since a last interrupt was sent to the host processor 102 are in the shared memory 520. In an example, the payload 146 in the field 122 of the packet may be replaced with a reference (e.g., memory pointer) to the chunk of the shared memory 520 with the payload 146 of the packet in the shared memory 520. In an example, the fragment based interrupt coalescing engine 110 may update the fields 118-122 with one or more of a checksum of the one or more fragments of the payload in the shared memory 520, number of fragments in the submessage (i.e., fragments not sent to the host processor 102), and the fragment starting index in the buffer. In summary, the fragment based interrupt coalescing engine 110 generates the modified packet by updating the fields 118-122 of the packet and including the reference to the payload of the packet in the shared memory 520. Further, at 511, the Ethernet controller 104 may send the modified packets which have not been received by the host processor 102 since a last interrupt was sent to the host processor 102. Based on the modified packets, the host processor 102 may access the respective payloads in the shared memory 520 having the one or more fragments using the reference in the modified packets. In some examples, the modified packets which have not been received by the host processor 102 since a last interrupt was sent to the host processor 102 may be further coalesced into fewer packets with respective payloads before being sent to the host processor 102. Further, in some examples, the Ethernet controller 104 may defragment at least one of the one or more fragments in the shared memory 520 reducing latency and load on the host processor 102.

Figure 6:
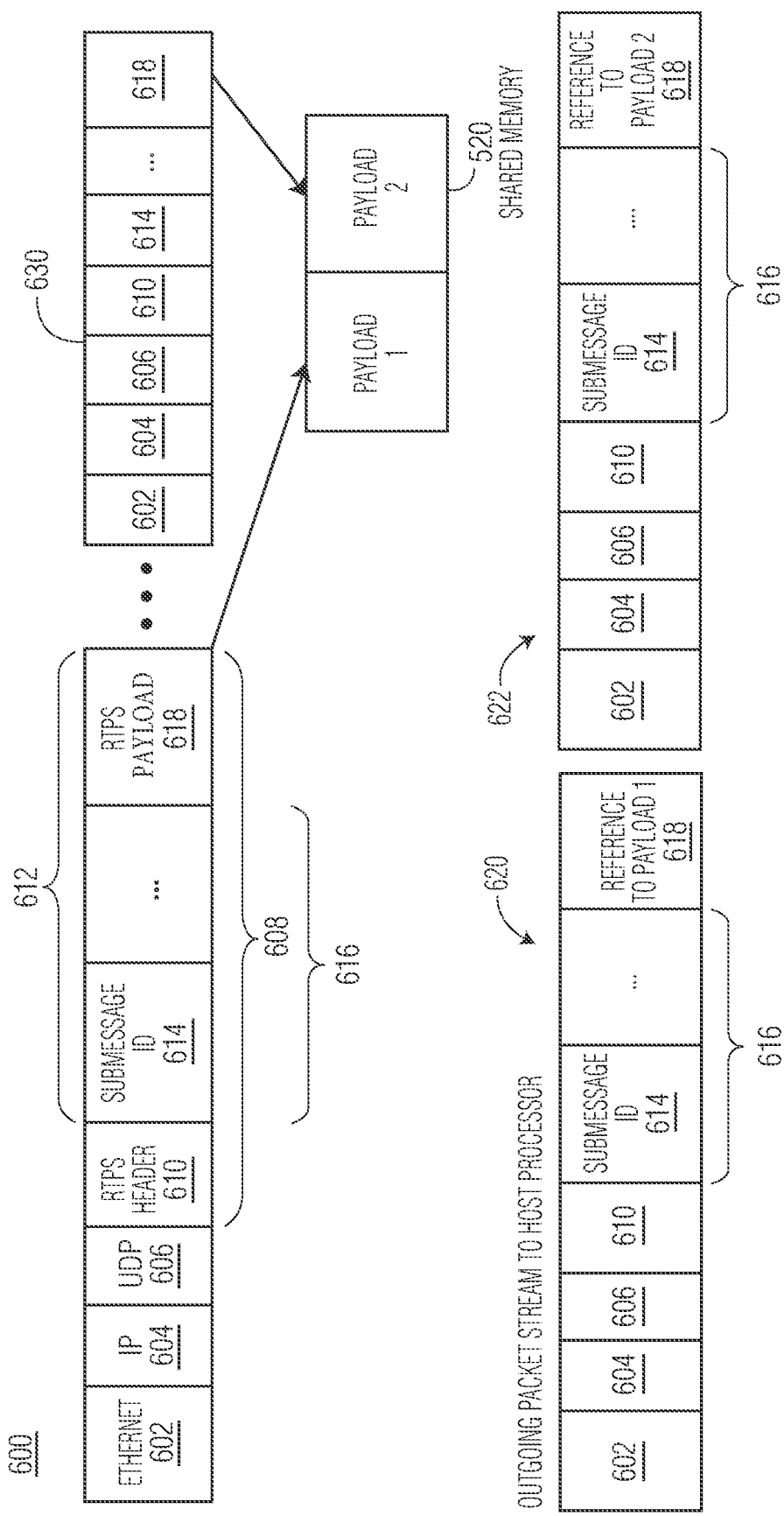
FIG. 6 illustrates an example of receiving a stream of packets and sending a stream of packets to host processor based on the functions of FIG. 5 in accordance with one or more embodiments.

In this embodiment, the host processor 102 may need to identify the reference ID in the payload 122 and use the payload pointer to access the payload and fragments in the shared memory 520. Applications running on the host processor 102 may not need to perform a copying operation to reassemble the payload and latency of high priority packets is improved even with aggressive interrupt coalescing FIG. 6 illustrates an example of receiving a stream of packets from the sensor 108 and sending a stream of packets to the host processor 102 based on the functions of FIG. 5 in accordance with an exemplary embodiment of the invention. The Ethernet controller 104 may receive a packet 600. In an example, the packet 600 may have the plurality of fields 118-122 corresponding to one or more of an Ethernet field or header 602, IP field or header 604, UDP field or header 606, and RTPS field 608 in an example. In an example, the packet 600 may be also referred to as an RTPS packet because it includes the RTPS field 608. The RTPS field 608 may include an RTPS header 610 followed by an RTPS submessage 612. The RTPS field 608 may have the magic which indicates the RTPS protocol format of the submessage 608. Further, the RTPS submessage 612 may comprise a plurality of fields 614, 618. Field 614 may be a submessage identifier such as 0x16 in the submessage header 616 which indicate that the RTPS submessage 612 comprises a fragment. An RTPS payload in field 618 may include one or more fragments. In the example, the Ethernet controller 104 may modify the packet 600 sent to the host processor 102 to packet 620. The packet 620 sent to the host processor 102 may have field 614 in the submessage header 616 set with a submessage identifier such as 0x56 which indicates that the RTPS payload in field 618 has a payload 146 with a reference to the fragment in the shared memory 520. This process may be repeated for another incoming packet 630 whose fragment in the payload 146 is stored in the shared memory 520. The packet 630 may be modified to packet 622. The host processor 102 may receive the packets corresponding to the incoming packets and use the reference in the packet to access one or more RPTS messages stored in the shared memory 520 having the one or more fragments.

As used herein, the term "coalescing" may refer to a grouping. In an example, interrupts associated with packets may be grouped into a single interrupt or coalesced interrupt to send the packets. In another example, a payload of packets may be grouped into a packet to form the coalesced packet. Further, in an example, the fragments whose interrupts are coalesced may be associated with abstraction layers other than the session layer of the OSI model.

In one embodiment, a method performed by a network controller is disclosed. The method comprises: receiving a packet transmitted from a remote device over a communication network to the network controller; detecting one or more fragments in a field of the packet, wherein the field is associated with a session layer or higher abstraction layer of an open systems interconnect (OSI) model; extracting fragment information from the packet which indicates one or more of a last fragment index associated with a last fragment of one or more fragment in the packet and a fragment count indicative of a number of fragments associated with a message which is fragmented; and coalescing interrupts associated with the packet with other interrupts associated with other packets based on one or more of the last fragment index and the fragment count. In an example, coalescing interrupts comprises performing a modulus operation on the last fragment index to determine whether to coalesce the interrupts. In an example, coalescing interrupts comprises determining that a last fragment index equals the fragment count. In an example, extracting the fragment information from the packet comprises determining a protocol of the session layer field; and extracting the fragment information in the session layer field of the packet based on the protocol being a given protocol. In an example, the given protocol is one of Real-Time Publish Subscribe (RTPS) or Scalable Service Oriented Middleware over IP (SOME/IP). In an example, coalescing interrupts comprises storing a payload of the packet in a buffer. In an example, the payload is stored in the buffer based on an offset to a packet index. In an example, the method further comprises sending a coalesced packet which comprises the stored payload and stored payloads of other packets not previously sent to the host processor in response to not coalescing the interrupts. In an example, the buffer is shared between the host processor and an Ethernet controller which receives the packet. In an example, the method further comprises sending a modified packet which comprises a reference to the stored payload and an identifier which indicates that the modified packet comprises the reference in response to not coalescing the interrupts.

In another embodiment, a network controller is disclosed. The network controller comprises: a receiver interface configured to receive a packet transmitted from a remote device over a communication network; a fragment detector configured to detect one or more fragments in a field of the packet, wherein the field is associated with a session layer or higher abstraction layer of an open systems interconnect (OSI) model; and an interrupt coalescing engine configured to extract fragment information from the packet which indicates one or more of a last fragment index associated with a last fragment of one or more fragment in the packet and a fragment count indicative of a number of fragments associated with a message which is fragmented; and coalesce interrupts associated with the packet with other interrupts associated with other packets based on one or more of the last fragment index and the fragment count. In an example, the interrupt coalescing engine is further configured to perform a modulus operation on the last fragment index to determine whether to coalesce the interrupts. In an example, the interrupt coalescing engine is further configured to determine that a last fragment index equals the fragment count. In an example, the interrupt coalescing engine configured to extract the fragment information from the packet comprises the interrupt coalescing engine configured to determine a protocol of the session layer field; and extract the fragment information in the session layer field of the packet based on the protocol being a given protocol. In an example, the given protocol is one of Real-Time Publish Subscribe (RTPS) or Scalable Service Oriented Middleware over IP (SOME/IP). In an example, the interrupt coalescing engine is further configured to store a payload of the packet in a buffer. In an example, the payload is stored in the buffer based on an offset to a packet index. In an example, the interrupt coalescing engine is further configured to send a coalesced packet which comprises the stored payload and payloads of other packets not previously sent to the host processor in response to not coalescing the interrupts. In an example, the buffer is shared between the host processor and an Ethernet controller which receives the packet. In an example, the interrupt coalescing engine is further configured to send a modified packet which comprises a reference to the stored payload and an identifier which indicates that the modified packet comprises the reference in response to not coalescing the interrupts.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method performed in a network controller comprising:
receiving a packet transmitted from a remote device over a communication network to the network controller;
detecting one or more fragments in a field of the packet, wherein the field is associated with a session layer or higher abstraction layer of an open systems interconnect (OSI) model;

extracting fragment information from the packet which indicates one or more of a last fragment index associated with a last fragment of one or more fragment in the packet and a fragment count indicative of a number of fragments associated with a message which is fragmented; and coalescing interrupts associated with the packet with other interrupts associated with other packets based on one or more of the last fragment index and the fragment count.

2. The method of claim 1, wherein coalescing interrupts comprises performing a modulus operation on the last fragment index to determine whether to coalesce the interrupts.

3. The method of claim 1, wherein coalescing interrupts comprises determining that a last fragment index equals the fragment count.

4. The method of claim 1, wherein extracting the fragment information from the packet comprises determining a protocol of the session layer field; and extracting the fragment information in the session layer field of the packet based on the protocol being a given protocol.

5. The method of claim 4, wherein the given protocol is one of Real-Time Publish Subscribe (RTPS) or Scalable Service Oriented Middleware over IP (SOME/IP).

6. The method of claim 1, wherein coalescing interrupts comprises storing a payload of the packet in a buffer.

7. The method of claim 6, wherein the payload is stored in the buffer based on an offset to a packet index.

8. The method of claim 6, further comprising sending a coalesced packet which comprises the stored payload and stored payloads of other packets not previously sent to the host processor in response to not coalescing the interrupts.

9. The method of claim 6, wherein the buffer is shared between the host processor and an Ethernet controller which receives the packet.

10. The method of claim 9, further comprising sending a modified packet which comprises a reference to the stored payload and an identifier which indicates that the modified packet comprises the reference in response to not coalescing the interrupts.

11. A network controller comprising:
a receiver interface configured to receive a packet transmitted from a remote device over a communication network;
a fragment detector configured with circuitry to detect one or more fragments in a field of the packet, wherein the field is associated with a session layer or higher abstraction layer of an open systems interconnect (OSI) model; and
an interrupt coalescing engine configured with circuitry to extract fragment information from the packet which indicates one or more of a last fragment index associated with a last fragment of one or more fragment in the packet and a fragment count indicative of a number of fragments associated with a message which is fragmented; and coalesce interrupts associated with the packet with other interrupts associated with other packets based on one or more of the last fragment index and the fragment count.

12. The network controller of claim 11, wherein the interrupt coalescing engine is further configured with circuitry to perform a modulus operation on the last fragment index to determine whether to coalesce the interrupts.

13. The network controller of claim 11, wherein the interrupt coalescing engine is further configured with circuitry to determine that a last fragment index equals the fragment count.

14. The network controller of claim 11, wherein the interrupt coalescing engine configured to extract the fragment information from the packet comprises the interrupt coalescing engine configured with circuitry to determine a protocol of the session layer field; and extract the fragment information in the session layer field of the packet based on the protocol being a given protocol.

15. The network controller of claim 14, wherein the given protocol is one of Real-Time Publish Subscribe (RTPS) or Scalable Service Oriented Middleware over IP (SOME/IP).

16. The network controller of claim 11, wherein the interrupt coalescing engine is further configured with circuitry to store a payload of the packet in a buffer.

17. The network controller of claim 16, wherein the payload is stored in the buffer based on an offset to a packet index.

18. The network controller of claim 16, wherein the interrupt coalescing engine is further configured with circuitry to send a coalesced packet which comprises the stored payload and payloads of other packets not previously sent to the host processor in response to not coalescing the interrupts.

19. The network controller of claim 16, wherein the buffer is shared between the host processor and an Ethernet controller which receives the packet.

20. The network controller of claim 19, wherein the interrupt coalescing engine is further configured with circuitry to send a modified packet which comprises a reference to the stored payload and an identifier which indicates that the modified packet comprises the reference in response to not coalescing the interrupts.

* * * * *